(12) United States Patent
AmRhein

(10) Patent No.: US 6,510,599 B2
(45) Date of Patent: Jan. 28, 2003

(54) APPARATUS AND METHOD FOR INSTALLING AND REMOVING CARABINERS AND FOR INSTALLING ROPE WITHIN THE CARABINERS

(76) Inventor: Frederick J. AmRhein, 17124 E. Oro Grande Dr., Fountain Hills, AZ (US) 85268

( * ) Notice: Subject to any disclaimer, the term of this patent is extended or adjusted under 35 U.S.C. 154(b) by 39 days.

(21) Appl. No.: 09/834,381

(22) Filed: Apr. 13, 2001

(65) Prior Publication Data

US 2002/0148093 A1 Oct. 17, 2002

(51) Int. Cl.⁷ .............................. B23P 19/00; B25B 27/00
(52) U.S. Cl. ........................ 29/426.1; 29/428; 29/270; 248/925
(58) Field of Search ................................ 29/426.1, 235, 29/270, 278, 428, 446, 450; 248/231.9, 925

(56) References Cited

U.S. PATENT DOCUMENTS

| | | | |
|---|---|---|---|
| 1,171,221 A | * | 2/1916 | Marion |
| 3,217,840 A | | 11/1965 | Holkesvick |
| 4,069,991 A | | 1/1978 | Saunders et al. |
| 4,238,862 A | * | 12/1980 | Leatherman |
| 4,491,291 A | | 1/1985 | Ching |
| 4,565,342 A | | 1/1986 | Grow |
| 4,712,754 A | | 12/1987 | Brodie |
| RE33,104 E | | 10/1989 | Taylor |
| 4,995,128 A | * | 2/1991 | Montgomery et al. |
| 5,038,888 A | | 8/1991 | Varner et al. |
| 5,352,172 A | | 10/1994 | Suzaki |
| 5,432,968 A | * | 7/1995 | Beck |
| 5,553,685 A | | 9/1996 | Cook |
| 5,934,635 A | | 8/1999 | Bohn |
| 6,009,582 A | * | 1/2000 | Harrison |
| 6,102,837 A | | 8/2000 | Hubbard |

* cited by examiner

Primary Examiner—P. W. Echols
(74) Attorney, Agent, or Firm—Jeffrey D. Moy; Harry M. Weiss; Weiss, Moy & Harris, P.C.

(57) ABSTRACT

A device for installing and removing a carabiner and for threading a rope within the carabiner has a main body section. A carabiner capture arm is movably coupled to the body section and is used for supporting the carabiner to be at least one of installed or removed. A rope holding arm is moveably coupled to the body section and is used for installing the rope within the carabiner.

22 Claims, 3 Drawing Sheets

APPARATUS AND METHOD FOR INSTALLING AND REMOVING CARABINERS AND FOR INSTALLING ROPE WITHIN THE CARABINERS

BACKGROUND OF THE INVENTION

1. Field of the Invention

This invention relates to rock climbing and, more specifically, to an apparatus that will aid in the installation and removal of carabiners from hard to reach places while climbing and which will further aid in the installation of rope within the installed carabiner.

2. Description of the Prior Art

Recently, rock climbing has become a popular sporting activity. A common piece of equipment used in rock climbing is a carabiner. A carabiner is used to attach ropes and other devices to placements. A placement is anything to which a carabiner may be attached. Placements may be made out of a variety of different materials. A placement may be a sling material, cord material, cable material, installed hangers, scaffolding, etc. Placements may be of different configurations, sizes, and orientations.

One type of placement is a hanger. A hanger is typically comprised of a formed piece of metal with two legs whose junction typically form a 90 degree angle. One leg of the formed piece has a circular hole machined in it for insertion of a bolt for the attachment of the hanger to a rock or other surface. The other leg, situated at 90 degree to a surface, has a larger clearance hole formed in it for the insertion of a carabiner, rope, or other gear used for climbing.

A carabiner has an oval shape body which is typically made of a solid light weight but sturdy material such as aluminum or steel. The carabiner generally has an opening on one side of the body. The opening is generally closed by a spring loaded gate. Opposite the spring loaded gate is the spine of the carabiner.

In order to advance up a mountain or other climbing surface, one must be able to insert the carabiner by opening the spring loaded gate of the carabiner and placing the opened carabiner through an opening in the placement/hanger. Many times this may be difficult since the placement/hanger may be out of arms reach of the climber. Even if the climber is successful in inserting the carabiner, the climber must still be able to thread a rope through the carabiner if he/she is to advance up the climbing surface. This is also difficult if the installed carabiner is out of arms reach of the climber.

Therefore, a need existed to provide a device and method which is able to install a carabiner. The device and method must be able to install a carabiner to a hanger/placement when the hanger/placement is out of reach for the user of the device. The device and method must further be able to thread a rope through a carabiner once the carabiner is installed on a hanger/placement. The device and method must further be able to remove a carabiner once the carabiner is installed on a hanger/placement.

SUMMARY OF THE INVENTION

In accordance with one embodiment of the present invention, it is an object of the present invention to provide a device and method which is able to install a carabiner.

It is another object of the present invention to provide a device and method that is able to install a carabiner in a hanger/placement when the hanger/placement is out of reach of an individual.

It is still another object of the present invention to provide a device and method that is able to thread a rope through a carabiner once the carabiner is installed on a hanger/placement.

It is still another object of the present invention to provide a device and method that is able to remove a carabiner once the carabiner is installed on a hanger/placement.

BRIEF DESCRIPTION OF THE PREFERRED EMBODIMENTS

In accordance with one embodiment of the present invention a device for installing and removing a carabiner and for threading a rope within the carabiner is disclosed. The device has a main body section. A carabiner capture arm is movably coupled to the body section and is used for supporting the carabiner to be at least one of installed or removed. A rope holding arm is moveably coupled to the body section and is used for installing the rope within the carabiner.

In accordance with another embodiment of the present invention a device for installing and removing a carabiner and for threading a rope within the carabiner is disclosed. The device has a body section. The body section has a rectangular cube member having a rounded top section. A substantially rectangular plate extends from the rounded top section. A carabiner capture arm is movably coupled to the body section. The carabiner capture arm is used for supporting and capturing the carabiner to be at least one of installed or removed. The carabiner capture arm comprises a substantially F-shaped member wherein the arms of the F-shaped member are used to hold and capture the carabiner. An opening is drilled through an end of the F-shaped member for coupling the carabiner capture arm to the body section. A passageway is drilled through a lower section of the body section. The passageway is used to hold and support a rope holding arm which is positioned in the passageway and rotatably coupled to the body section.

In accordance with another embodiment of the present invention a method for installing a carabiner is disclosed. The method comprises the steps of: providing a device for installing the carabiner wherein the device comprises: a body section; a carabiner capture arm movably coupled to the body section for supporting the carabiner to be installed; and a rope holding arm moveably coupled to the body section; rotating the carabiner capture arm till the carabiner capture arm is approximately perpendicular to the body section; placing the carabiner with a gate of the carabiner in a closed position within the carabiner capture arm; rotating the carabiner capture arm upward causing the carabiner capture arm to open the gate of the carabiner; moving the device so the opened carabiner is inserted in a hanger; rotating the device so the carabiner capture arm rotates away from the gate of the carabiner and allows the gate to close; and pulling the device downward to disengage the device from the carabiner.

In accordance with another embodiment of the present invention a method for removing an installed carabiner comprising the steps of: providing a device for removing the carabiner wherein the device comprises: a body section; a carabiner capture arm movably coupled to the body section for supporting and capturing the carabiner to be removed; and a rope holding arm moveably coupled to the body section; rotating the carabiner capture arm till the carabiner capture arm is approximately perpendicular to the body section; positioning the device so the carabiner capture arm will capture the carabiner to be removed; capturing the carabiner by placing the carabiner with a gate of the carabiner in a closed position within the carabiner capture arm; rotating the carabiner capture arm upward causing the carabiner capture arm to open the gate of the carabiner; and moving the device so the opened carabiner is removed from a hanger.

In accordance with another embodiment of the present invention a method for threading a rope in a carabiner is disclosed. The method comprises the steps of: providing a device for threading the rope in the carabiner wherein the device comprises: a body section; a carabiner capture arm movably coupled to the body section; and a rope holding arm moveably coupled to the body section; rotating the rope capture arm in an upward direction to open the rope capture arm; forming a loop with the rope; placing each end of the loop of rope in the rope holding arm; rotating the rope capture arm in a downward direction to close the rope capture arm; positioning the loop of rope in the device around a closed gate of the carabiner; pulling the loop of rope which applies pressure to the gate and opens the gate of the carabiner; and releasing the loop of rope from the device.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Referring to the Figures, a climbing device 10 is shown. The climbing device 10 is used to install and remove carabiners from hangers/placements (hereinafter placements) and to thread a rope through an installed carabiner. The device 10 has a body section 12. The body section 12 is substantially a rectangular cube in shape. The top of the body section 12 is rounded to form a semi-circular top section. An arm 14 extends from the rounded top section of the body section 12. At the top of the arm 14 is a stopper 16. The stopper 16 is generally a piece of rubberized material.

Figures 1, 2:
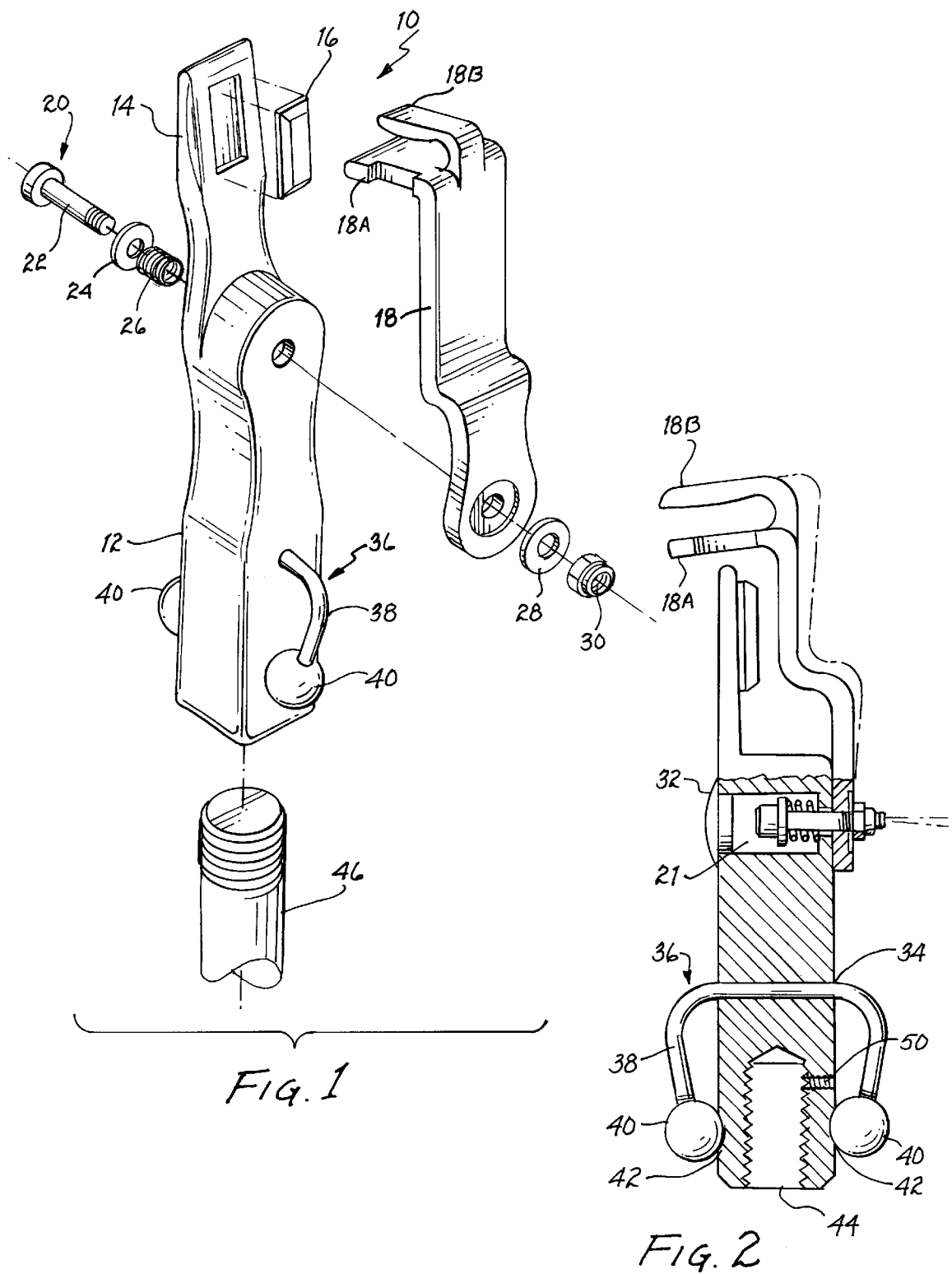
FIG. 1 is an exploded perspective view of the present invention.
FIG. 2 is a cross-sectional side view of the present invention.
Figure 3:
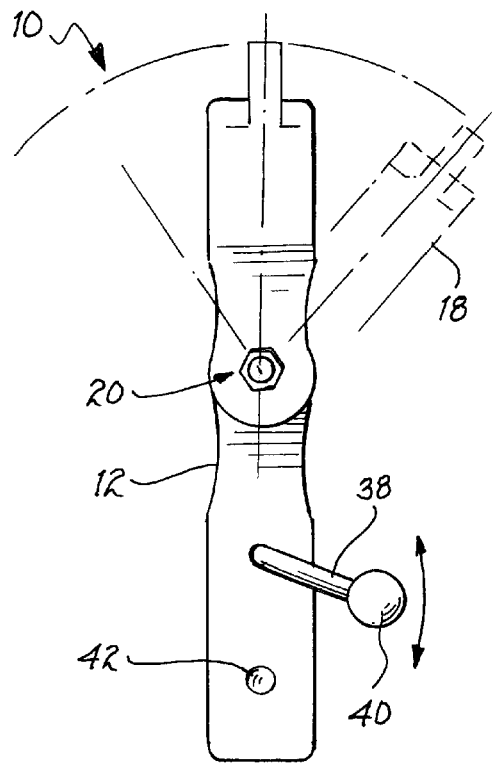
FIG. 3 is a front view of the present invention showing the movement of the carabiner capture arm and the rope holding rods.
Figure 4:
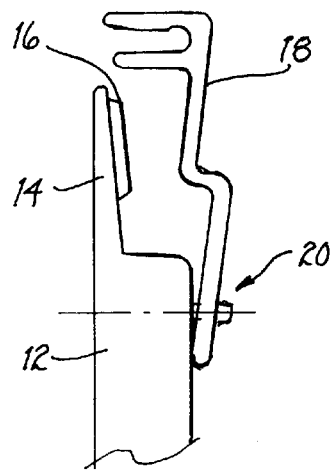
FIG. 4 is a side view of the present invention further showing the movement of the carabiner capture arm.

A carabiner capture arm 18 is coupled to the body section 12. The carabiner capture arm 18 has an inner capture protrusion 18A and an outer capture protrusion 18B. These protrusions 18A and 18B are used to install and remove the carabiner. This will be described below in the operation section. The carabiner capture arm 18 is generally coupled to the semicircular top section. The carabiner capture arm 18 is coupled to the body section 12 so that the carabiner capture arm 18 may move in a clockwise or counter-clockwise direction around the arm 14 as depicted in FIG. 3. The carabiner capture arm 18 is further coupled to the body section 12 so that the carabiner capture arm 18 is able to be pulled back from and away from the arm 14. This is best depicted in FIG. 4. In the embodiment depicted in the Figures, a recess 21 is made within the body section 12 near the semi-circular top section. At the bottom of the recess 21, an opening is drilled through. An opening is further drilled through a lower section of the carabiner capture arm 18. When the two openings are aligned together, a holding assembly 20 is placed through the two openings. The holding assembly 20 couples the carabiner capture arm 18 to the body section 12 while allowing for the above mentioned movement of the carabiner capture arm 18.

The holding assembly 20 is generally a spring loaded device. In accordance with one embodiment of the present invention, the holding assembly 20 uses a pivot bolt 22. The pivot bolt 22 is placed through a washer 24. A spring 26 is also positioned on the stem of the pivot bolt 22. The pivot bolt 22 is then placed through both openings until the stem of the pivot bolt 22 extends through the second opening. A second washer 28 is then placed on the stem of the pivot bolt 22. A locking nut 30 is then placed on the stem of the pivot bolt 22. A cover 32 may be placed over the recess 21 to cover part of the holding assembly 20.

Another opening 34 is drilled through a lower section of the body section 12. The opening 34 is used to hold the rope holding rods 36. The rope holding rods 36 is a comprised of a U-shaped rod 38 which is placed through the opening 34. At each end of the U-shaped rod 38 is a ball member 40. The ball members 40 will rest in a recessed portion 42 of the body section 12.

At the bottom of the body section 12 is an opening 44. The opening 44 is generally a threaded opening. The threaded opening 44 will allow a threaded pole 46 to be coupled to the device 10. This will allow one to extend the reach of the device 10. In order to properly secure the pole to the device 10. A locking mechanism 50 may be used. The locking mechanism 50 may include a locking screw or the like.

OPERATION

Figure 9:
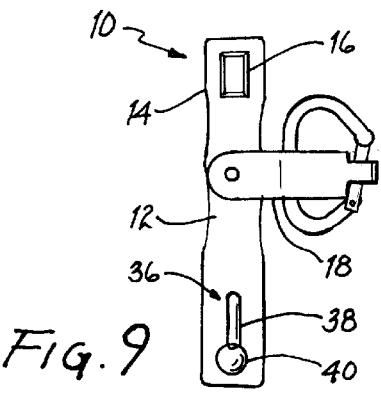
FIG. 9 is a side view of the present invention showing the carabiner capture arm at a 90 degree angle and holding a carabiner.

In order to install a carabiner, the carabiner capture arm 18 is rotated so that the carabiner capture arm 18 is approximately at a 90 degree angle to the longitudinal axis of the body section 12. This is shown in FIG. 9. A typical carabiner with the spring gate of the carabiner in a closed position is situated and held by the carabiner capture arm 18. This is done by having the spring loaded gate of the carabiner positioned between the inner capture protrusion 18A and an outer capture protrusion 18B. The carabiner is situated so that the spring loaded gate faces away from the body section 12 and is approximately parallel to the longitudinal axis of the device 10 as shown most clearly in FIG. 9.

With the device 10 held securely and the carabiner capture arm 18 with the carabiner and the spring loaded gate aligned as described above, a force is applied in order to rotated the carabiner capture arm 18 in an upward motion towards the vertical axis of the body section 12. This is illustrated best in FIG. 10. In order to rotate the carabiner capture arm 18, a small force is applied by pulling the top of the carabiner. The inner capture protrusion 18A will make contact with the inner surface of the carabiner or the spring loaded gate. This causes the carabiner capture arm 18 to rotate about its pivot point. In doing so the outer capture protrusion 18B will make contact with the outer surface of the spring loaded gate of the carabiner. The outer capture protrusion 18B will force the spring loaded gate open with little rotation of the carabiner. The carabiner capture arm 18 will stop short of being placed in a vertical position. This is due to the fact that the carabiner will be pinched between the stopper 16 and the carabiner capture arm 18.

Figure 11:
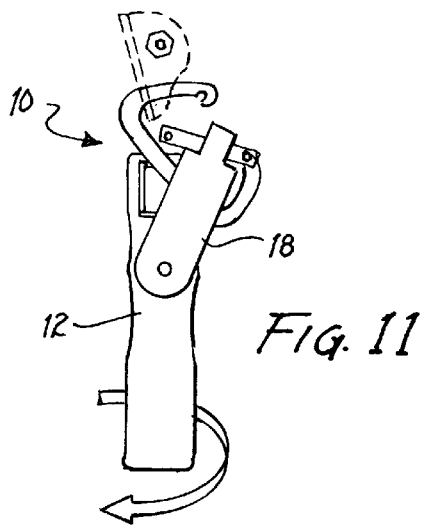
FIG. 11 is a side view of the present invention depicting the present invention used to install a carabiner in a hanger/placement.
Figure 12:
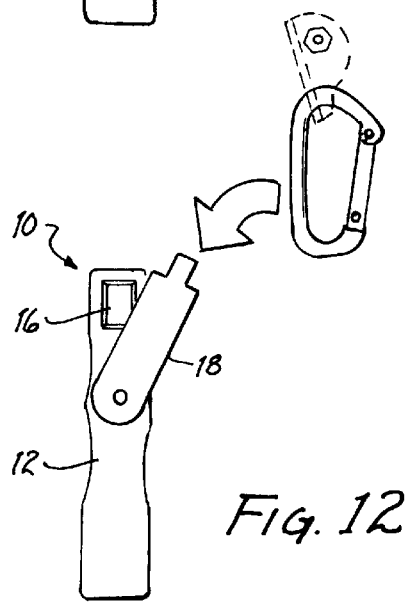
FIG. 12 is a side view of the present invention depicting how the present invention is used to remove an installed carabiner.

With the carabiner captured within the device 10 and the spring loaded gate opened, a user of the device 10 can install the carabiner in a hanger. If one is rock climbing, one may extend the device 10 by attaching a pole 46 to the device 10. The user may then try to insert the spring loaded gate of the carabiner through an opening in the hanger. Once the carabiner has been inserted in the opening of the hanger, the device 10 is rotated about its longitudinal axis as shown in FIG. 11. Since the carabiner is positioned in the hanger, the carabiner cannot freely rotate. Thus, the rotation of the device 10 causes the carabiner capture arm 18 to rotate away from the spring loaded gate. As the device 10 is further rotated, the inner capture protrusion 18A and the outer capture protrusion 18B of the carabiner capture arm 18 will disengage from the spring loaded gate. A downward pull of the device 10 after disengaging the spring loaded gate will remove the device 10 from the carabiner. This is most clearly illustrated in FIG. 12.

The device 10 may further be used to remove an installed carabiner. The steps are similar to that described above. The carabiner capture arm 18 is rotated so that the carabiner capture arm 18 is approximately at a 90 degree angle to the longitudinal axis of the body section 12 similar to that shown in FIG. 9. The carabiner capture arm 18 is then used to capture the carabiner so that the carabiner is situated in the device similar to that shown in FIG. 9 (with the exception that now the carabiner is installed on a hanger). Capturing of the carabiner is done by having the spring loaded gate of the carabiner positioned between the inner capture protrusion 18A and an outer capture protrusion 18B. The carabiner is situated so that the spring loaded gate faces away from the body section 12 and is approximately parallel to the longitudinal axis of the device 10 as shown in FIG. 9.

With the device 10 held securely and the carabiner capture arm 18 with the carabiner and the spring loaded gate aligned as described above, a downward force is applied which causes the inner capture protrusion 18A to make contact with the inner surface of the carabiner. Since the carabiner is held in place by the hanger (not shown), this causes the carabiner capture arm 18 to rotate about its pivot point. In doing so the outer capture protrusion 18B will make contact with the outer surface of the spring loaded gate of the carabiner. Continued application of the force will cause the outer capture protrusion 18B to force the spring loaded gate to open with little rotation of the carabiner as shown in FIG. 10 (again with the exception that now the carabiner is installed on a hanger).

Figure 10:
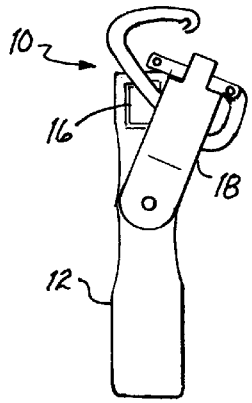
FIG. 10 is a side view of the present invention showing the carabiner capture arm holding the carabiner with the spring 20 loaded gate in an opening position.

As the downward force is continued to be applied on the device 10, the spring loaded gate of the carabiner becomes completely opened such that the spring loaded gate hits the inner spine of the carabiner as shown in FIG. 10. Continued rotation of the carabiner capture arm 18 forces the carabiner to rotate from its near vertical orientation such that the carabiner is now fully captured with the spring loaded gate fully opened (FIG. 10). Now that the carabiner is completely captured with an open spring loaded gate, the carabiner can be lifted from the hanger by a slight lifting and lateral movement of the device 10.

It should be noted that with the device 10 and the pole 46, a carabiner may be installed or removed in hangers at distances which may be out of arms reach of the individual. By using the device 10 less than vertical, vertical, and overhanging hanger placement and removal may be achieved. The device 10 is able to install and remove a carabiner with the spring loaded gate facing any direction.

Figure 6:
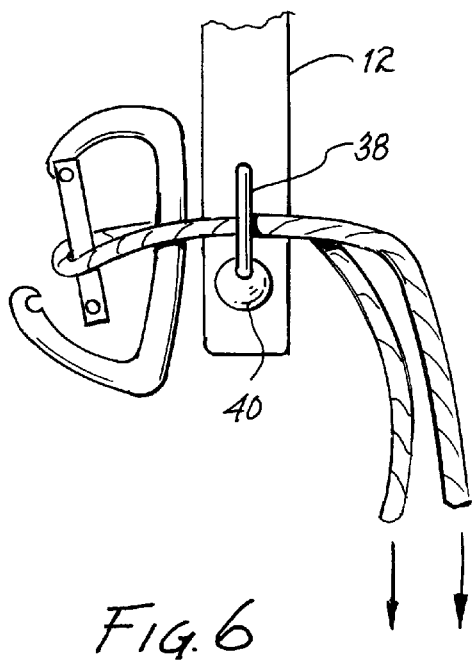
FIG. 6 is a side view of the present invention being used to thread a rope through an installed carabiner.

The device 10 is also used to aid in the threading of a rope through a carabiner. In order to use the device for this purpose and for ease of threading the rope in the device 10, the rope holding rod 36 is rotated upward so that the ball members 40 are now positioned near a mid-section of the body section 12 (see FIG. 3). Each end of a loop of rope is then inserted through an opening formed between the rope holding rod 36 and the body section 12. The rope holding rod 36 is then rotated to a closed position as shown in FIGS. 5 and 6 so that the ball members 40 will rest in a recessed portion 42 of the body section 12.

Figure 5:
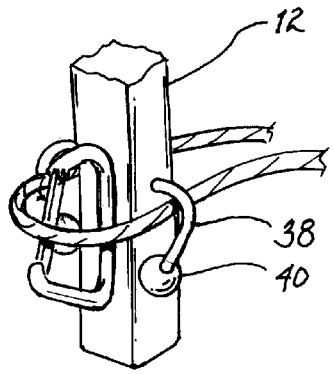
FIG. 5 is a perspective view of the present invention being used to thread a rope through an installed carabiner.

With the rope loop formed and captured within the device 10, the rope loop is placed around a carabiner so that the loop of rope is placed around the spring loaded gate of the carabiner as shown in FIG. 5. Either one or both ends of the loop of rope is pulled causing the diameter of the loop to decrease in size. This causes the rope to impinge on the spring loaded gate and thus opening the spring loaded gate as shown in FIG. 6. The device 10 with the captured loop of rope is moved slightly to slide the rope within the interior of the carabiner. Once the rope is in the interior of the carabiner, the spring loaded gate is free to close as shown in FIG. 9. The rope is now installed in the carabiner. Once the rope is in the carabiner, the device 10 can be either slide down the rope or the rope may be quickly freed from the device 10.

Figure 7:
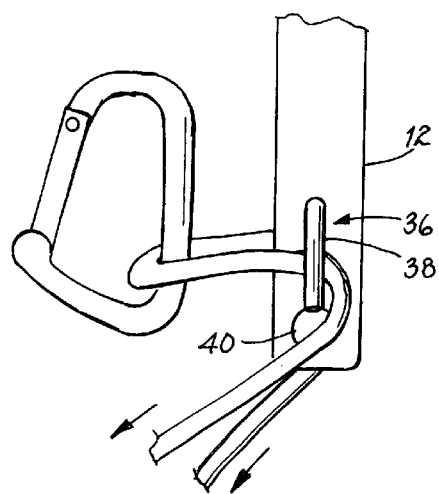
FIG. 7 is a side view of the present invention once the rope is captured by the carabiner.
Figure 8:
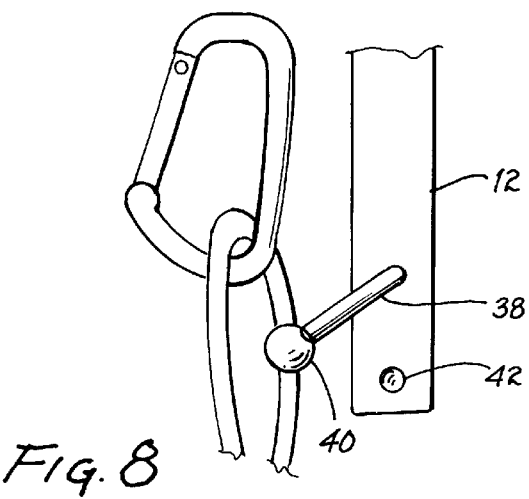
FIG. 8 is a side view of the present invention after the rope is captured by the carabiner and released by the present invention.

Pulling on one or both ends of the loop of rope will activate a quick release mechanism of the device 10. By pulling on the rope as shown in FIG. 7, the ball members 40 of the rope holding rod 36 will be forced to rotate out of the recessed portion 42 of the body section 12. This will allow the rope to be released from the rope holding rode 36 and the device 10 as shown in FIG. 8.

It should be noted that the device 10 may be used for placing rope loops into objects other than a carabiner. For example, the device may be used to insert a rope into a hook with a rope opening. The use of a carabiner is just an example and should not be seen as to limit the scope of the present invention.

The device 10 may further be used for grabbing or catching a rope while climbing. The inner capture protrusion 18A and the outer capture protrusion 18B of the carabiner capture arm 18 form a semi-hook member. The end of both of the inner capture protrusion 18A and the outer capture protrusion 18B may be used to reach for and capture a dangling rope which is hanging from a carabiner or other hanger. With the use of the threaded pole 46, one would be able to capture ropes which would ordinarily be out of reach of the climber.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A device for installing and removing a carabiner and for threading a rope within the carabiner comprising, in combination:
   a body section;
   a carabiner capture arm movably coupled to the body section for supporting the carabiner to be at least one of installed or removed;
   a rope holding arm moveably coupled to the body section; and
   a holding assembly which moveably couples the carabiner capture arm to the body section and allows the carabiner capture arm to rotate in a clockwise and counterclockwise direction and to be resiliently pulled away from the body section.

2. The device in accordance with claim 1 wherein the body section comprises:
   a rectangular cube member having a rounded top section; and
   a substantially rectangular plate extending from the rounded top section.

3. The device in accordance with claim 2 further comprising a stopper coupled to a top section of the substantially rectangular plate.

4. The device in accordance with claim 3 wherein the stopper is a rubberized stopper.

5. The device in accordance with claim 2 further comprising a passageway drilled through a lower section of the body section wherein the passageway is used for supporting the rope holding arm and for allowing the rope holding arm to be rotatably coupled to the body section.

6. The device in accordance with claim 5 wherein the rope capture arm comprises:
   a U-shaped rod member positioned within the passageway; and
   ball members coupled to each end of the U-shaped rod member.

7. The device in accordance with claim 1 wherein the holding assembly comprises:
   pivot bolt;
   a compression spring placed around a stem of the pivot bolt; and
   a locking nut coupled to the stem of the pivot bolt.

8. The device in accordance with claim 1 wherein the carabiner capture arm comprises:
   a substantially F-shaped member;
   an opening drilled through an end of the F-shaped member for coupling the carabiner capture arm to the body section.

9. The device in accordance with claim 2 further comprising a threaded opening drilled in a bottom section of the rectangular cube member for attaching a rod to the device.

10. The device of claim 9 further comprising a locking mechanism coupled to the threaded opening for locking the rod to the device.

11. A device for installing and removing a carabiner and for threading a rope within the carabiner comprising, in combination:
   a body section wherein the body section comprises:
      a rectangular cube member having a rounded top section; and
      a substantially rectangular plate extending from the rounded top section;
   a carabiner capture arm movably coupled to the body section for supporting and capturing the carabiner to be at least one of installed or removed wherein the carabiner capture arm comprises:
      a substantially F-shaped member wherein arms of the F-shaped member are used to hold and capture the carabiner; and
      an opening drilled through an end of the F-shaped member for coupling the carabiner capture arm to the body section;
   a passageway drilled through a lower section of the body section; and
   a rope holding arm positioned in the passageway and rotatably coupled to the body section.

12. The device in accordance with claim 11 further comprising a stopper coupled to a top section of the substantially rectangular plate.

13. The device in accordance with claim 12 wherein the stopper is a rubberized stopper.

14. The device in accordance with claim 11 wherein the rope capture arm comprises:
   a U-shaped rod member positioned within the passageway; and
   ball members coupled to each end of the U-shaped rod member.

15. The device in accordance with claim 11 further comprising a holding assembly which moveably couples the carabiner capture arm to the body section and allows the carabiner capture arm to rotate in a clockwise and counterclockwise direction and to be pulled away from the body section.

16. The device in accordance with claim 15 wherein the holding assembly comprises:
   pivot bolt;
   a compression spring placed around a stem of the pivot bolt; and
   a locking nut coupled to the stem of the pivot bolt.

17. The device in accordance with claim 11 further comprising a threaded opening drilled in a bottom section of the rectangular cube member for attaching a rod to the device.

18. The device of claim 17 further comprising a locking mechanism coupled to the threaded opening for locking the rod to the device.

19. A method for installing a carabiner comprising the steps of:
   providing a device for installing the carabiner wherein the device comprises:
      a body section;
      a carabiner capture arm movably coupled to the body section for supporting the carabiner to be installed; and
      a rope holding arm moveably coupled to the body section;
   rotating the carabiner capture arm till the carabiner capture arm is approximately perpendicular to the body section;
   placing the carabiner with a gate of the carabiner in a closed position within the carabiner capture arm;
   rotating the carabiner capture arm upward causing the carabiner capture arm to open the gate of the carabiner;

moving the device so the opened carabiner is inserted in a hanger;

rotating the device so the carabiner capture arm rotates away from the gate of the carabiner and allows the gate to close; and pulling the device downward to disengage the device from the carabiner.

20. A method for removing an installed carabiner comprising the steps of:

providing a device for removing the carabiner wherein the device comprises:

a body section;

a carabiner capture arm movably coupled to the body section for supporting the carabiner to be removed; and a rope holding arm moveably coupled to the body section;

rotating the carabiner capture arm till the carabiner capture arm is approximately perpendicular to the body section;

positioning the device so the carabiner capture arm will capture the carabiner to be removed;

capturing the carabiner by placing the carabiner with a gate of the carabiner in a closed position within the carabiner capture arm;

rotating the carabiner capture arm upward causing the carabiner capture arm to open the gate of the carabiner; and moving the device so the opened carabiner is removed from a hanger.

21. A method for threading a rope in a carabiner comprising the steps of:

providing a device for threading the rope in the carabiner wherein the device comprises:

a body section;

a carabiner capture arm movably coupled to the body section for supporting the carabiner to be at least one of installed or removed; and a rope holding arm moveably coupled to the body section;

rotating the rope capture arm in an upward direction to open the rope capture arm;

forming a loop with the rope;

placing each end of the rope loop in the rope holding arm;

rotating the rope capture arm in a downward direction to close the rope capture arm;

positioning the loop of rope in the device around a closed gate of the carabiner;

pulling the loop of rope which applies pressure to the gate and opens the gate of the carabiner; and releasing the loop of rope from the device.

22. The method of claim 21 wherein the step of releasing the loop of rope from the device further comprises the step of abruptly pulling the loop of rope once the rope is in the carabiner to rotate the rope holding arm of the device away from the body section.

* * * * *